United States Patent
Seltzer et al.

(10) Patent No.: US 8,532,985 B2
(45) Date of Patent: Sep. 10, 2013

(54) WARPED SPECTRAL AND FINE ESTIMATE AUDIO ENCODING

(75) Inventors: Michael L. Seltzer, Seattle, WA (US); James G. Droppo, Carnation, WA (US); Henrique S. Malvar, Redmond, WA (US); Alejandro Acero, Bellevue, WA (US); Xing Fan, Dallas, TX (US)

(73) Assignee: Microsoft Coporation, Redmond, WA (US)

( * ) Notice: Subject to any disclaimer, the term of this patent is extended or adjusted under 35 U.S.C. 154(b) by 341 days.

(21) Appl. No.: 12/959,386

(22) Filed: Dec. 3, 2010

(65) Prior Publication Data

US 2012/0143599 A1     Jun. 7, 2012

(51) Int. Cl.
*G10L 15/02* (2006.01)

(52) U.S. Cl.
USPC .......................................................... 704/205

(58) Field of Classification Search
USPC .......................................................... 704/205
See application file for complete search history.

(56) References Cited

U.S. PATENT DOCUMENTS

| | | | |
|---|---|---|---|
| 7,050,969 B2 | 5/2006 | Raj et al. | |
| 7,110,953 B1 | 9/2006 | Edler et al. | |
| 2002/0065649 A1 | 5/2002 | Kim | |
| 2003/0139930 A1 | 7/2003 | He et al. | |
| 2006/0053009 A1 | 3/2006 | Jeong et al. | |
| 2008/0004869 A1 | 1/2008 | Herre et al. | |
| 2012/0265534 A1* | 10/2012 | Coorman et al. | 704/265 |

FOREIGN PATENT DOCUMENTS

JP     11327600 A     11/1999

OTHER PUBLICATIONS

"International Search Report", Mailed Date: May 30, 2012, Application No. PCT/US2011/063196, Filed Date: Dec. 3, 2011, pp. 8.

Digalakis, et al., "Quantization of Cepstral Parameters for Speech Recognition over the World Wide Web", Retrieved at <<http://ieeexplore.ieee.org/stamp/stamp.jsp?tp=&arnumber=743698>> In IEEE Journal on Selected Areas in Communications, vol. 17, No. 1, Jan. 1999, pp. 82-90.

So, et al., "Improved Noise-Robustness in Distributed Speech Recognition via Perceptually-Weighted Vector Quantisation of Filterbank Energies", Retrieved at <<http://maxwell.me.gu.edu.au/spl/publications/papers/euro05_so_dsr.pdf>> Interspeech'2005—Eurospeech, Sep. 4-8, 2005, pp. 7.

Paliwal, et al., "Scalable Distributed Speech Recognition Using Multi-Frame GMM-Based Block Quantization", Retrieved at <<http://citeseerx.ist.psu.edu/viewdoc/download?doi=10.1.1.59.1281&rep=rep1&type=pdf>> 2004, pp. 4.

(Continued)

*Primary Examiner* — Susan McFadden
(74) *Attorney, Agent, or Firm* — Jared S. Goff

(57) ABSTRACT

A warped spectral estimate of an original audio signal can be used to encode a representation of a fine estimate of the original signal. The representation of the warped spectral estimate and the representation of the fine estimate can be sent to a speech recognition system. The representation of the warped spectral estimate can be passed to a speech recognition engine, where it may be used for speech recognition. The representation of the warped spectral estimate can also be used along with the representation of the fine estimate to reconstruct a representation of the original audio signal.

20 Claims, 6 Drawing Sheets

(56) References Cited

OTHER PUBLICATIONS

Shao, et al., "Clean Speech Reconstruction from Noisy Mel-Frequency Cepstral Coefficients Using a Sinusoidal Model", Retrieved at <<http://citeseerx.ist.psu.edu/viewdoc/download?doi=10.1.1.64.4303&rep=rep1&type=pdf>> In the proceedings of Acoustics, Speech, and Signal Processing, vol. 1, Apr. 6-10, 2003, pp. 4.

Huerta, et al., "Speech Recognition from GSM Codec Parameters", Retrieved at <<http://www.cs.cmu.edu/~robust/Papers/icslp98_juan.pdf>> In ICSLP 1998, pp. 4.

Raj, et al., "Distributed Speech Recognition with Codec Parameters", Retrieved at <<http://citeseerx.ist.psu.edu/viewdoc/download?doi=10.1.1.3.7710&rep=rep1&type=pdf>> Dec. 2001, pp. 6.

Ramaswamy, et al., "Compression of Acoustic Features for Speech Recognition in Network Environments", Retrieved at <<http://citeseerx.ist.psu.edu/viewdoc/download?doi=10.1.1.131.2286&rep=rep1&type=pdf>>, Appears in: Acoustics, Speech and Signal, Proceedings of the 1998 IEEE International Conference on May 12-15, 1998, pp. 4.

"Low-complexity coding at 24 and 32 kbit/s for hands-free operation in systems with low frame loss", Series G: Transmission Systems and Media, Digital Systems and Networks: Digital terminal equipments—Coding of analogue signals by methods other than PCM, ITU-T Rec. G.722.1, May 2005, pp. 36.

"Speech Processing, Transmission and Quality Aspects (STQ); Distributed speech recognition; Extended front-end feature extraction algorithm; Compression algorithms; Back-end speech reconstruction algorithm", ETSI Standard, ETSI ES 202 211 V1.1.1, Nov. 2003, pp. 74.

* cited by examiner

WARPED SPECTRAL AND FINE ESTIMATE AUDIO ENCODING

BACKGROUND

Typical voice codecs such as those used in mobile phones and Voice Over IP (VOIP) networks encode an original speech signal using a scheme designed for improving perceptual quality for human listeners, not for speech recognition performance. In contrast, speech recognition systems often encode voice recognition features, such as representations of warped frequency spectral estimates (also referred to herein as warped spectral estimates), using a scheme designed for improving speech recognition performance. Some schemes have attempted to use encoded speech recognition features to construct audio signals, and some schemes have attempted to use encoded voice codec features to perform speech recognition.

SUMMARY

Prior attempts to use encoded speech recognition features to construct audio signals have had only limited success, resulting in constructed audio signals that are not close representations of the original audio signal. Similarly, prior attempts to use encoded voice codec features for speech recognition have also had limited success. The tools and techniques described herein can include using a warped spectral estimate of an original audio signal to encode a fine estimate of fine features of the original signal. The representation of the warped spectral estimate can be used for speech recognition, and can also be used along with the representation of the fine estimate to reconstruct a reconstructed audio signal that represents the original audio signal.

As used herein, an original audio signal or original speech signal is an audio signal that is used to encode a warped spectral estimate representation. The original signal may be a raw audio signal, or an audio signal that has been pre-processed in one or more of various ways. A warped spectral estimate is a frequency domain estimate of an audio signal that is warped by varying the range of frequency bins represented by the spectrum. A smooth estimate is a smoothed estimate that provides high level, or course, details about a corresponding audio signal. A fine estimate is an estimate of fine details of a waveform of an original audio signal, where the fine details are finer than those provided in the smooth estimate that is used to encode the fine estimate. A fine estimate is not merely information such as pitch information, which provides some details on features of an audio waveform, but does not actually estimate the fine details of the waveform. A reconstructed audio signal is a signal that is constructed from estimates of an original audio signal, so that the reconstructed audio signal represents an approximation of the original audio signal.

In one embodiment, the tools and techniques can include encoding a representation of a warped frequency spectral estimate from an original audio signal. The encoding can be based on a warped frequency spectrum and can include a dynamic range reduction operation. A representation of a smooth estimate of the original audio signal can be generated using the warped frequency spectral estimate representation. Additionally, a fine estimate representation of the fine details of the original audio signal can be encoded using the representation of the smooth estimate.

In another embodiment of the tools and techniques, a representation of a warped frequency spectral estimate of an original audio signal can be decoded. A representation of a fine estimate of the original audio signal can also be decoded. The representation of the warped frequency spectral estimate can be passed to a speech recognition engine. Additionally, an audio signal that represents the original audio signal can be reconstructed using the representation of the warped frequency spectral estimate and the representation of the fine estimate. The reconstruction can include expanding a dynamic range of the representation of the warped frequency spectral estimate.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved encoding/decoding of audio features, such as improved encoding/decoding of features that can be used in speech recognition, and that may also be used in audio signal reconstruction. Such improvements may result from the use of various techniques and tools separately or in combination.

Such techniques and tools may include using a warped spectral estimate, which has traditionally been used for speech recognition, to encode a fine estimate of an original audio signal. Representations of the warped spectral estimate and the fine estimate can be sent to a speech recognition system and used for speech recognition as well as reconstructing a representation of the original audio signal. For example, the warped spectral estimate representation can be passed to a speech recognition engine. Additionally, the warped spectral estimate representation can be used along with the fine estimate representation to reconstruct a representation of the audio signal. For example, the warped spectral estimate representation can be used to generate a smooth estimate, which can be combined with the fine estimate to encode a reconstructed audio signal that represents the original audio signal.

Accordingly, one or more substantial benefits can be realized from the tools and techniques described herein. For example, speech recognition features (warped spectral estimate representation) can be used for speech recognition as well as for encoding a fine estimate of an original audio signal and reconstructing an audio signal the represents the original audio signal. The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

Figure 1:
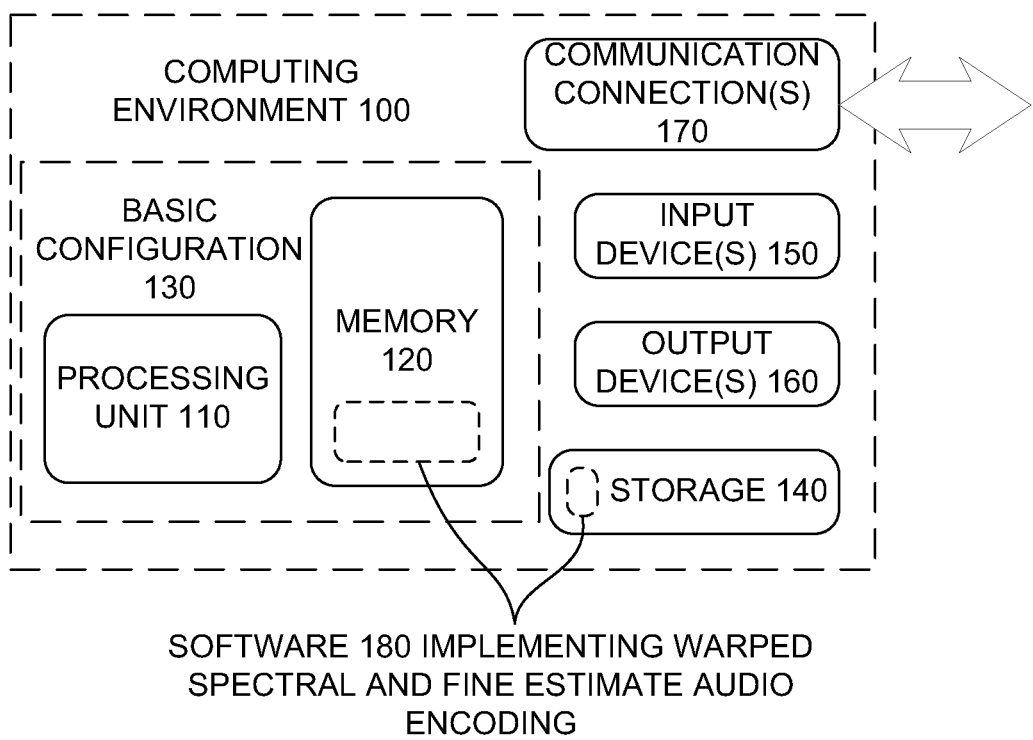
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as an encoding system and/or a speech recognition system. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing warped spectral and fine estimate audio encoding.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable storage media. Computer-readable storage media are any available non-transitory storage media that can be accessed within a computing environment. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Audio Coding System and Environment

Figure 2:
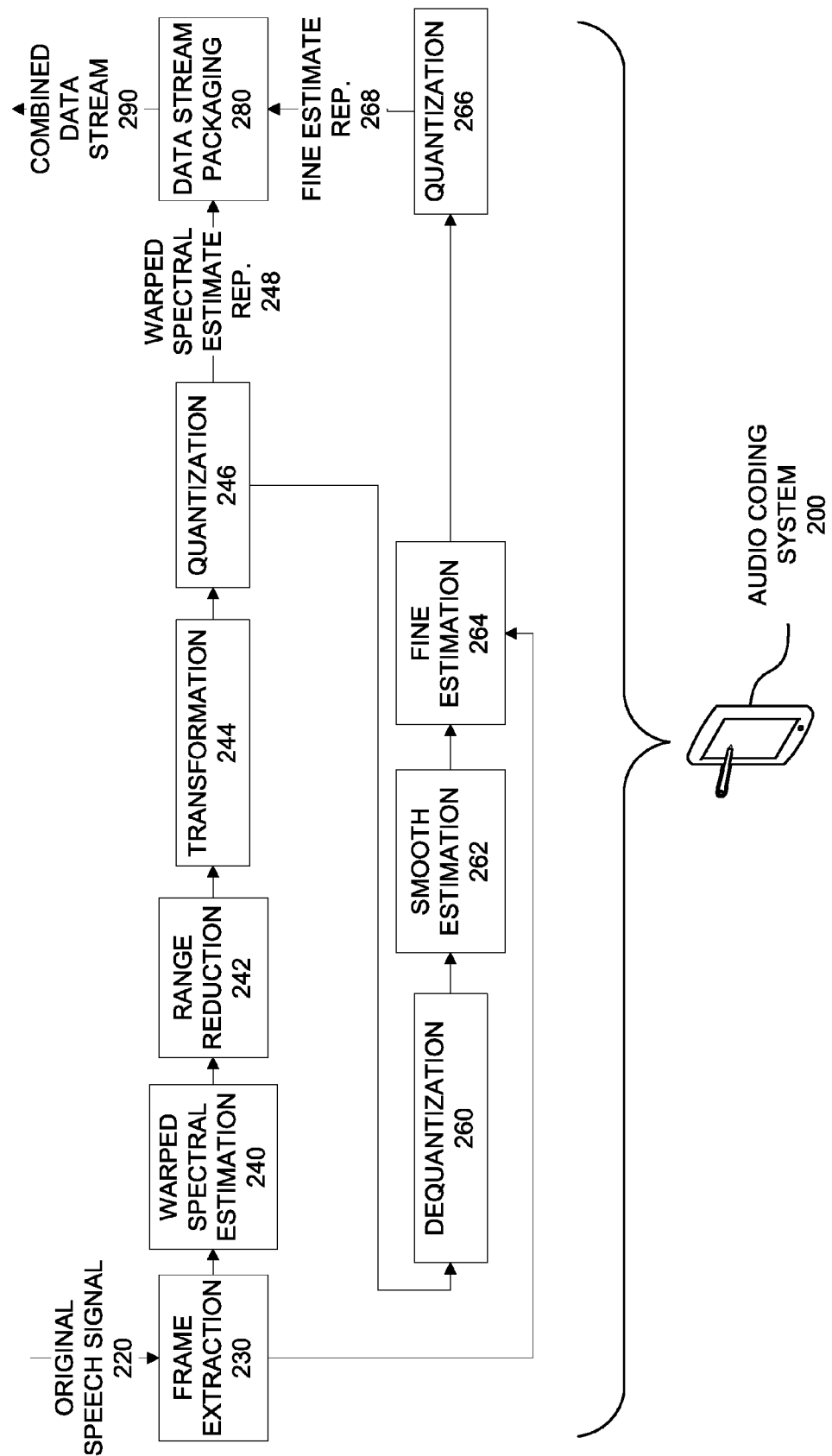
FIG. 2 is a schematic diagram of an audio coding system.

FIG. 2 is a schematic diagram of an audio coding system (200). The audio coding system (200) can include software and/or hardware for performing the acts described below with reference to FIG. 2. While the audio coding system (200) is illustrated as a mobile handheld device, the audio coding system may be some other type of computer system, such as one or more of the types of computer systems discussed above with reference to FIG. 1.

An original speech signal (220) can be received at the audio coding system (200). The original speech signal (220) may be a raw audio signal, or an audio signal that has been pre-processed in one or more ways. The audio coding system can perform frame extraction (230) to break the original speech signal (220) into time-based frames. The frames may be overlapping. For example, the frames may overlap by fifty percent, or some other percentage. The other operations of FIG. 2, as well as the operations of FIG. 3 discussed below can be performed on a frame-by frame basis until reconstruction of an audio signal, which can combine frames (e.g., using overlap add techniques).

For each frame, the audio coding system (200) can perform a warped frequency spectral estimation (240). For example, the warped spectral estimation (240) may be a mel-spectral estimation, which may compute twenty-four or some other number of mel-spectral energies per audio frame. As an example, for narrowband speech, the estimation (240) may apply 22 filters ranging from zero to four kilohertz. As another example, for wideband speech, the estimation (240) may apply 24 filters ranging from zero to eight kilohertz. Alternatively, the warped spectral estimation (240) may be some other type of estimation, such as a warped frequency spectral estimate that is based on some other frequency scale besides a mel scale, such as linear or exponential scale. The audio coding system (200) can perform a dynamic range reduction (242) of the mel-spectral energies. For example, this may be done by performing a log operation (e.g., natural log operation or a base 10 log operation), a root operation (cube root operation, fifteenth root, etc.), or some other operation for dynamic range reduction (242). The audio coding system (200) can also perform a transformation (244) on the energies, such as a discrete cosine transform, producing range-reduced and transformed mel-frequency cepstral coefficients (MFCCs).

The audio coding system can perform a lossy compression operation, such as quantization (246), on the MFCCs to produce a warped spectral estimate representation (248) (of course, the values produced by each of the warped spectral estimation (240), range reduction (242), transformation (244) can also be considered to be warped spectral estimation representations). The quantization (246) may be any of various different types of quantization. As an example, the quantization (246) may be scalar quantization using adaptive differential coding. This quantization (246) can be similar to the quantization done for adaptive differential pulse code modulation (ADPCM), except that the quantization can be applied to each component of a vector that represents the MFCCs as if that component were a waveform. As an example, if there are twenty-four MFCCs, the adaptive differential coding can treat each of the twenty-four MFCCs as a time series, and apply the adaptive differential coding to that series. Dynamic mean normalization can be applied in the quantization (246) and in the dequantization operations discussed below. For example, this normalization may only be done in the first two MFCCs, $C_0$ and $C_1$. To decorrelate the coefficients over time, a scaled version of the previously quantized value can be subtracted from the current sample, to produce an error value e(n) for an nth value in the coefficient time series, according to Equation 1 below.

$$e(n)=x(n)-\alpha\hat{x}(n-1) \quad \text{Equation 1}$$

In Equation 1, x(n) is the current sample, $\alpha$ is a scaling factor, and $\hat{x}(n-1)$ is the quantized previous value. The error value e(n) can be fed to a uniform scalar quantizer. As in conventional ADPCM, the quantization step size can be dynamically adjusted based on the most recent value of e(n). This quantization operation can be implemented using a two-stage lookup table. The current quantized value can be used as an index to look up a step size adjustment factor. This value can be added to the current adjustment factor and the resulting new value can be used as an index to look up a step size in the step-size table. Alternatively, the quantization (246) may include some other type of quantization, such as vector quantization using codebooks.

Dequantization (260) that matches the quantization (246) can be performed to produce a dequantized warped spectral estimate representation. These dequantized warped spectral estimate representation can be used in performing a smooth estimation (262). The resulting smooth estimate representation can be used, along with the frame-extracted audio signal for the corresponding frame to perform a fine estimation (264), which can produce a representation of fine features of the audio signal.

The smooth estimation (262) can vary depending on the type of fine estimation (264) that will be performed, and the fine estimation (264) may be performed according to existing speech codec schemes. For example, the fine estimation (264) may be done using a transform codec scheme. Alternatively, the fine estimation may be done using a source-filter model scheme. For example, the smooth estimation may define the filters in the source-filter model scheme. In any event, the smooth estimation (262) can be performed in a manner that it provides a smooth estimation (262) that is formatted in a manner that can be used in the codec scheme to produce the fine estimation (264).

Following is an example of the smooth estimation (262) using a Siren codec to provide context for implementing the smooth estimation (262). However, the smooth estimation (262) and the overall tools and techniques described herein may be used with a wide variety of codecs, including a variety of transform codecs and a variety of source-filter model codecs. Siren is a wideband codec that encodes audio from 0-7 kHz. It operates on 40 ms frames (640 samples) with a 50% frame overlap. Each frame is processed by a Modulated Lapped Transform (MLT), which results in 320 real valued MLT coefficients. The encoding and decoding is performed independently for each frame. To encode the signal, a smooth spectral estimate is computed as follows. The MLT coefficients for each frame are first divided into 14 uniform regions between 0 and 7 kHz, corresponding to a width of 500 Hz. The root-mean-square (RMS) energy in each region is computed from the MLT coefficients to provide a coarse representation of the spectral envelope.

Based on the RMS energy values, the MLT coefficients in each of the 14 regions are quantized using a process called categorization. During the categorization process, a deterministic search is performed to find the set of quantization and coding parameters that most accurately represents the MLT coefficients in each region while maximizing but not exceeding the given bit budget.

In summary, the encoding performed by Siren is based on two stages: (1) the computation of the smooth spectral estimate including the RMS energy in 14 spectral sub-bands; and (2) the categorization procedure that encodes all of the MLT coefficients using the RMS energy values.

In the smooth estimation (262), the 14 RMS energy values can be derived from the encoded MFCC coefficients, rather than computing them directly from the MLT coefficients. Then, the fine estimation (264) can include the categorization procedure that encodes all of the MLT coefficients using the derived RMS energy values.

To perform the smooth estimation (262) to produce a smooth estimation representation for use in the fine estimation (264) according to the Siren codec, for example, 24 MFCCs (which represent energy values of 24 mel-spaced frequency sub-bands) can be used to compute the energy in 14 uniformly spaced frequency sub-bands. The frame extraction (230) may provide different frame sizes and frame rates for the warped spectral estimation (240) than those provided to the fine estimation (264) (for example, the frame extraction (230) may include two different frame extraction procedures or it may integrate two different procedures). As an example, the frame extraction (230) may provide the fine estimation (264) with frame sizes and rates that are standard for a voice codec, and may provide the warped spectral estimate (24) with frame sizes and rates that are standard for speech recognition schemes. In a specific implementation, the warped spectral estimation (240) may receive 25 ms frames at a rate of 100 frames per second, while the fine estimation (264) may use 40 ms frames at 50 frames per second. Additionally, the warped spectral estimation (240) and the fine estimation (264) may use different representations in different domains. As an example, the warped spectral estimation (240) can use a spectral representation based on a fast Fourier transform (FFT) while the fine estimation can use a spectrum derived from the MLT. The smooth estimation (262) can include conversions to account for such differences.

For example, in order to compute the energy in 14 uniformly spaced sub-bands, the MFCC processing pipeline (including the warped spectral estimation (240), the range reduction (242), the transformation (244), and the quantization (246)) can be basically inverted to obtain an estimate of the power spectrum. With typical ways of computing MFCCs, the process is not actually invertible because the MFCC encoding is a lossy process. However a smoothed power spectrum can be estimated according to Equation 2 below.

$$X_{POW}=M^{\dagger}\exp(C^{-1}\hat{X}_{MFCC}) \quad \text{Equation 2}$$

In Equation 2, $M^{\dagger}$ is the pseudo-inverse of the matrix that contains the mel filter bank, $C^{-1}$ is the square inverse discrete cosine transform, and the exp( ) operator applies element-wise to the MFCC vector. From this smooth power spectrum, the RMS energy in 14 uniformly spaced sub-bands between 0 and 7 kHz can be estimated by averaging values in the appropriate FFT bins.

As noted above, the warped spectral estimation (240) and the fine estimation (264) can use frequency representations based on different transforms. For example, the warped spectral estimation (240) use a representation based on FFT, while the fine estimation (264) can use a representation based on MLT. The RMS energy values estimated from an FFT-based power spectrum may be biased when comparing to those values computed from an MLT. For example, consider the following expression in Equation 3 for one RMS energy in one of the 500 Hz sub-bands, computed from the average of 20 MLT coefficients.

$$MLT_{RMS} = \sqrt{\frac{1}{20}\sum_{m=0}^{19} |mlt(m)|^2} \quad \text{Equation 3}$$

$$= \sqrt{\frac{2}{20N}\left\{\sum_{m=0}^{19} [|\mathit{fft}(m+0.5)|^2 - (-1)^m O(m)]\right\}}$$

$$\approx \sqrt{\frac{2}{N}} \sqrt{\frac{1}{20}\sum_{m=0}^{19} [|\mathit{fft}(m+0.5)|^2}$$

$$\approx \sqrt{\frac{2}{N}} FFT_{RMS}$$

In Equation 3, $O(m)=(R^2-I^2)\sin(2A)$, $$A = \frac{\pi}{N}(m+0.5),$$

R and I are real and imaginary parts of fft(m+0.5), and N is the size of the MLT. Thus, the RMS computed from the MLT can be considered to differ from that computed from the FFT by a constant scale factor. Accordingly, the RMS energy values derived from the MFCCs can be appropriately scaled prior to their use in the fine estimation (264).

As discussed above, different frame sizes and rates may also be considered. For example, the warped spectral estimation (240) may receive 25 ms frames at a rate of 100 frames per second, while the fine estimation (264) may use 40 ms frames at 50 frames per second. Accordingly, the RMS estimate computed from the MFCC features may only be accurate for a portion of the corresponding codec frame. Because the frame rate for the warped spectral estimation (240) is twice the frame rate for the fine estimation (264), an estimation may be performed as follows: the RMS energy estimates from two consecutive MFCC feature vectors can be averaged to get the estimate for the corresponding frame for the fine estimation (264). The resulting 14 RMS energy values derived from the MFCC feature vectors can be used for the fine estimation (264), which can proceed according to one of various audio codecs, such as using the categorization of the Siren codec.

Quantization (266) can be performed on the values resulting from the fine estimation (264), which can result in a fine estimate representation (268) (the representation of the estimate before quantization (266) is also such a representation). For example, this quantization (266) may be rule-based vector quantization. Data stream packaging (280) can be performed on the quantized warped spectral estimate representation (248) and the fine estimate representation (268). This packaging (280) may include entropy coding, splitting bits into packets for transmission, etc. Accordingly, the packaging (280) can produce a combined data stream (290) that includes the warped spectral estimate representation (248) and the fine estimate representation (268). This combined data stream (290) can be sent to a speech recognition system, such as the one discussed below with reference to FIG. 3.

III. Speech Recognition System and Environment

Figure 3:
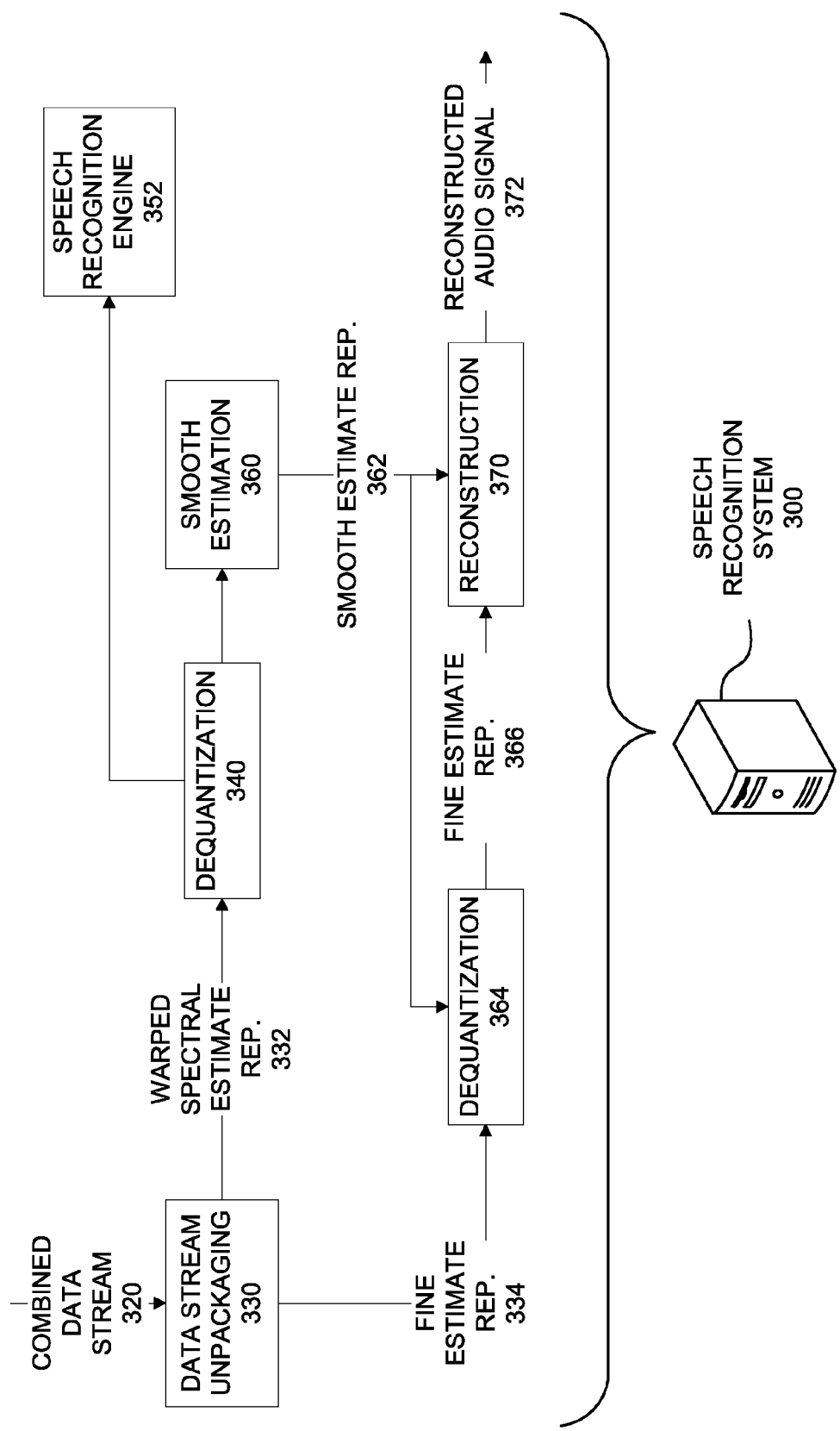
FIG. 3 is a schematic diagram of a speech recognition system.

FIG. 3 is a schematic diagram of a speech recognition system (300). The speech recognition system (300) can include software and/or hardware for performing the acts described below with reference to FIG. 3. While the speech recognition system (300) is illustrated as a server device, the speech recognition system may be some other type of computer system, such as one or more of the types of computer systems discussed above with reference to FIG. 1. Indeed, the audio coding system (200) of FIG. 2 and the speech recognition system (300) of FIG. 3 may be implemented in various environments, such as in the same computer system (e.g., in the same physical and/or virtual machine), or in computer systems that are remote from each other (e.g., where the computer systems are included in different real and/or virtual machines).

The speech recognition system (300) can receive a combined data stream (320) and perform data stream unpackaging (330), which may invert the operations of the data stream packaging (280) of FIG. 2 and split the combined data stream (320) into a warped spectral estimate representation (332) and a fine estimate representation (334). The warped spectral estimate representation (332) can be dequantized (340) (which may be done using a dequantization operation corresponding to the quantization (246)), and the dequantized representation (e.g., MFCCs) can be sent to a speech recognition engine (352). In one mode of operation where no audio signal is to be reconstructed, one or more of the remaining operations discussed below may not be performed. However, if an audio signal is to be reconstructed, then the following operations can be performed. These audio reconstruction operations may be performed at the same time as speech recognition operations, or at some other time. Similarly, these audio reconstruction operations may be performed in the same machine(s) as speech recognition, or in some other machine(s) that may be located locally and/or remotely from the speech recognition machine(s). A smooth estimation (360) can be performed on the dequantized representation of the warped spectral estimate to produce a smooth estimate representation (362). This smooth estimation (360) can be the same as the smooth estimation (262) that was done to produce a smooth estimate representation to be used in the fine estimation (264) in the audio coding system (200) of FIG. 2.

Additionally, dequantization (364) can be performed on the fine estimate representation (334) to produce a dequantized fine estimate representation (366). This dequantization (364) can correspond to the quantization (266) that was performed in the audio coding system (200), and can use the smooth estimate representation (362). The speech recognition system (300) can perform reconstruction (370) of a speech signal (372) that represents the original speech signal (220) that was encoded in the encoding system (200). This reconstruction (370) can use the smooth estimate representation (362) and the dequantized fine estimate representation (366), combining these representations (362 and 366) according to a speech codec. For example, this reconstruction (370) may include adding the values of the fine estimate representation (366) and the smooth estimate representation (362), performing an inverseMLT, and overlap adding frames.

As has been noted above, a specific example has been provided herein that involves a transform codec and a speech recognition system that uses MFCC values. However, the tools and techniques described herein may be used with various different speech recognition schemes that use warped frequency spectrum estimation, and/or with various different audio codec schemes (e.g., transform codecs, source-filter model codecs, etc.).

IV. Techniques for Warped Spectral and Fine Estimate Audio Encoding

Several techniques for warped spectral and fine estimate audio encoding will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 4:
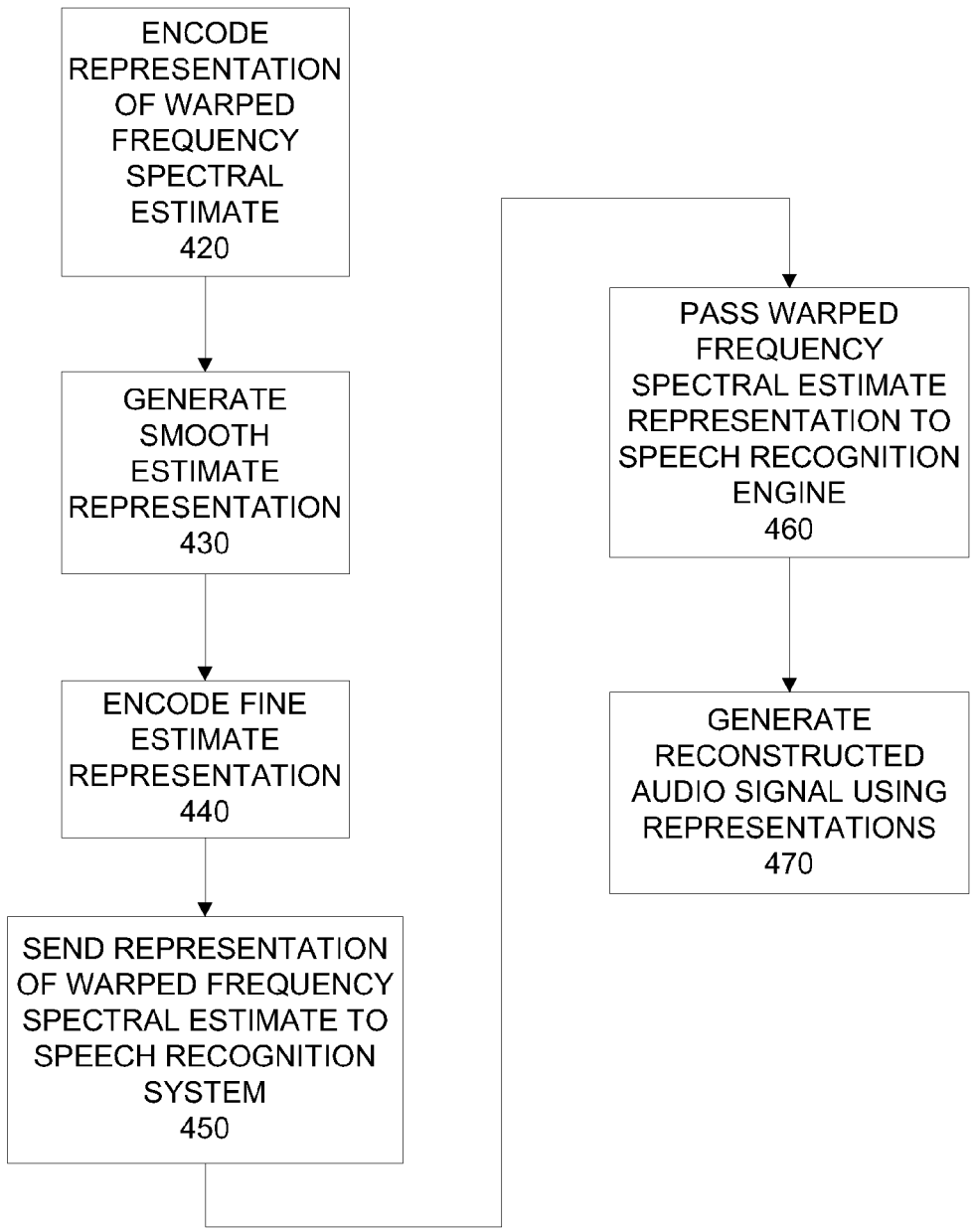
FIG. 4 is a flowchart of technique for warped spectral and fine estimate audio encoding.

Referring to FIG. 4, a technique for warped spectral and fine estimate audio encoding will be described. The technique can include encoding (420) a representation of a warped frequency spectral estimate from an original audio signal, such as a mel-frequency spectral estimate. The encoding (420) can be based on a warped frequency spectrum. Additionally, the encoding (420) can include a dynamic range reduction operation, and may also include performing a discrete cosine transform operation on the warped frequency spectrum and/or quantizing using adaptive differential coding. The technique can also include generating (430) a representation of a smooth estimate of the original audio signal. The generation (430) can use the warped frequency spectral estimate representation, and it may include performing a transform operation. The smooth estimate representation can be used in encoding (440) a fine estimate representation of fine details of the original audio signal. The fine estimate representation can be configured according to a transform codec framework. For example, the fine estimate may be configured according to the Siren codec or some other codec. The fine estimate can represent a fine spectral estimate in a frequency domain, and encoding (440) the fine estimate can be performed at least in part in a frequency domain.

A representation of the warped frequency spectral estimate can be sent (450) to a speech recognition system. The representation of the warped frequency spectral estimate can be passed (460) to a speech recognition engine. Additionally, the technique can include generating (470) a reconstructed audio signal representing the original audio signal using the representation of the warped frequency spectral estimate and the representation of the fine estimate. As used herein, a representation may be processed in various ways, such as by transforming it, performing lossy and/or lossless compression techniques, etc. and it can still be considered to be the same representation so long as it still represents the same item(s) before and after such processing. For example, a representation of fine spectral estimate can be quantized and entropy coded, and still considered to be the representation of the fine spectral estimate.

Figure 5:
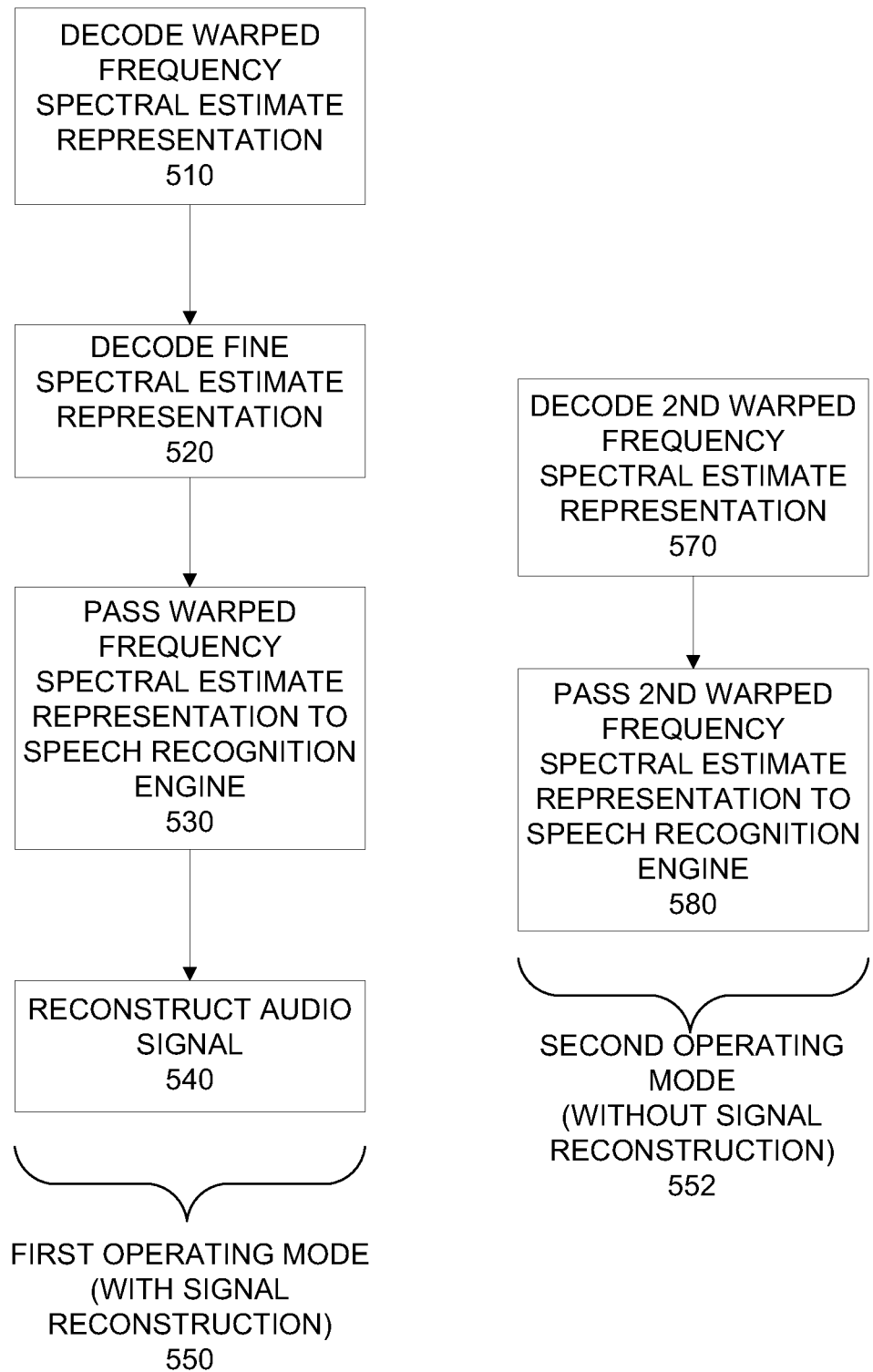
FIG. 5 is a flowchart of another technique for warped spectral and fine estimate audio encoding.

Referring to FIG. 5, another technique for warped spectral and fine estimate audio encoding will be described. The technique can include decoding (510) a representation of a warped frequency spectral estimate of an original audio signal. The technique can also include decoding (520) a representation of a fine estimate of the original audio signal, which may include using the decoded warped frequency spectral estimate. The representation of the warped frequency spectral estimate and the representation of the fine estimate can both be extracted from the same data stream. The representation of the warped frequency spectral estimate can be passed (530) to a speech recognition engine. An audio signal that represents the original audio signal can be reconstructed (540) using the representation of the warped frequency spectral estimate and the representation of the fine estimate. The reconstruction (540) can include expanding a dynamic range of the representation of the warped frequency estimate. Additionally, the reconstruction (540) can include performing an inverse of a transform operation on the representation of the warped frequency spectral estimate. For example, the transform operation can be a discrete cosine transform operation, so that the inverse of the transform operation is an inverse discrete cosine transform operation.

For the sake of clarity in the following discussion, the warped frequency spectral estimate can be termed a first warped frequency spectral estimate, and the original audio signal can be termed a first original audio signal. Additionally, decoding the representation of the first warped frequency spectral estimate, decoding the representation of the fine estimate, passing the representation of the first warped frequency spectral estimate to the speech recognition engine, and reconstructing the audio signal that represents the first original audio signal can all be performed in a first operating mode (550). The technique can also include performing acts in a second operating mode (552) that omits audio signal reconstruction. For example, the first operating mode (550) may be used sometimes when it is desirable to reconstruct an audio signal and play it back, and the second operating mode (5520) may be used at other times when audio signal reconstruction and playback are not desired. In the second operating mode (552), a representation of a second warped frequency spectral estimate of a second original audio signal can be decoded (570). Also in the second operating mode (552), the representation of the second warped frequency spectral estimate can be passed (580) to the speech recognition engine. However, the second mode (552) can omit reconstruction of an audio signal that represents the second original audio signal. Accordingly, a speech recognition system may transition between the first operating mode (550) and the second operating mode (552), depending on whether only speech recognition is to be done, or whether speech recognition and audio signal reconstruction are to be done. A speech recognition system may also include a third mode where only audio signal reconstruction is done, without doing speech recognition.

Figure 6:
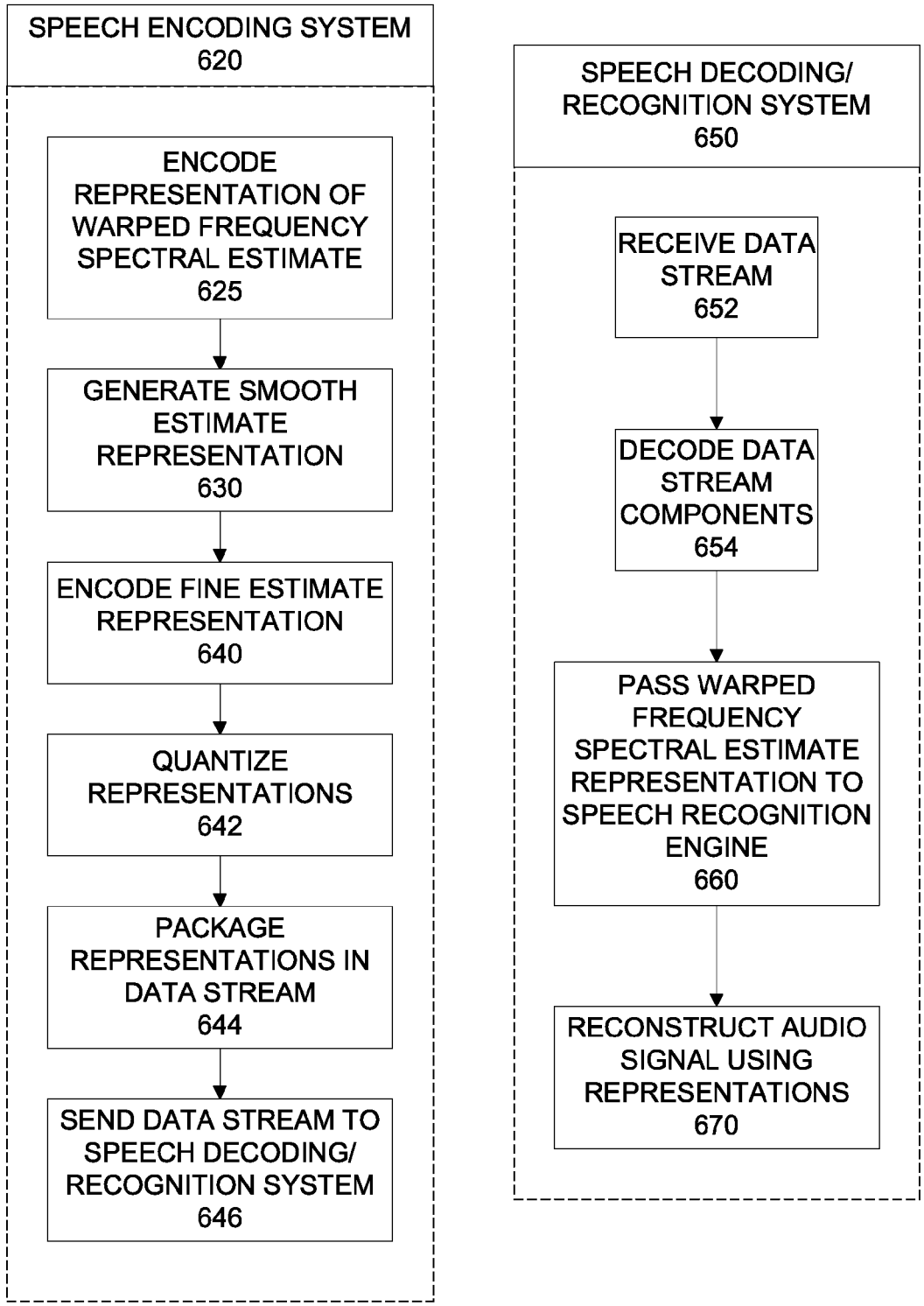
FIG. 6 is a flowchart of yet another technique for warped spectral and fine estimate audio encoding.

Referring to FIG. 6, yet another technique for warped spectral and fine estimate audio encoding will be described. The technique may be performed by a mobile handheld device or some other device. The technique can be divided into acts to be performed in an encoding system (620) and acts to be performed in a decoding and recognition system (650). The acts performed in the encoding system (620) can include encoding (625) a representation of a warped frequency spectral estimate of an original audio signal based on a warped frequency spectrum. The encoding (625) can include a dynamic range reduction operation and a cosine transform operation. The acts performed in the encoding system (620) can also include generating (630) a representation of a smooth spectral estimate of a spectrum of the original audio signal using the warped frequency spectral estimate representation. Additionally, the acts performed in the encoding system (620) can include encoding (640) a representation of a fine frequency spectral estimate of fine details of the original audio signal using the smooth estimate representation. Also in the encoding system (620), the representation of the warped frequency spectral estimate and the representation of the fine estimate can be quantized (642) and packaged (644) in a data stream, and the data stream can be sent (646) to a speech decoding and recognition system.

In the decoding and recognition system (650), the data stream can be received (652) and components of the data stream can be decoded (654). The decoding (654) can include decoding the representation of the warped frequency spectral estimate of the original audio signal, and decoding the representation of the fine spectral estimate of the original audio signal. The representation of the warped frequency spectral estimate can be passed (660) to a speech recognition engine in the speech recognition system. Additionally, an audio signal that represents the original audio signal can be reconstructed (670). The reconstruction can include expanding a dynamic range of the representation of the warped frequency spectral estimate, performing an inverse of the cosine transform operation, using the warped frequency spectral estimate representation to generate a smooth spectral estimate representation, and combining the smooth spectral estimate with the fine spectral estimate. The decoding (654) of components, the passing (660), and the reconstruction (670) can all be performed in the speech decoding and recognition system. However, these acts may be performed in different sub-systems that may be remote from each other, and the acts may be performed at different times from each other, and/or at different times from one or more of the acts performed in the speech encoding system (620).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
an audio coding computer system encoding a representation of a warped frequency spectral estimate from an original audio signal, the encoding being based on a warped frequency spectrum;
generating a representation of a smooth estimate of the original audio signal using the warped frequency spectral estimate representation; and
encoding a fine estimate representation of fine details of the original audio signal using the representation of the smooth estimate.

2. The method of claim 1, wherein the encoding comprises a range reduction operation.

3. The method of claim 1, wherein warped frequency spectral estimate is a mel-frequency spectral estimate.

4. The method of claim 1, wherein the fine estimate representation is configured according to a transform codec framework.

5. The method of claim 1, wherein the fine estimate representation represents a fine spectral estimate in a frequency domain.

6. The method of claim 1, wherein encoding the representation of the warped frequency spectral estimate further comprises performing a discrete cosine transform operation on the warped frequency spectrum.

7. The method of claim 1, further comprising passing the representation of the warped frequency spectral estimate to a speech recognition engine.

8. The method of claim 1, wherein generating the representation of the smooth estimate comprises performing an inverse transform operation.

9. The method of claim 1, wherein encoding the fine estimate is performed at least in part in a frequency domain.

10. The method of claim 1, further comprising sending a representation of the warped frequency spectral estimate to a speech recognition system.

11. The method of claim 1, wherein encoding the representation of the warped frequency spectral estimate comprises quantizing using adaptive differential coding.

12. The method of claim 1, further comprising generating a reconstructed audio signal representing the original audio signal using the representation of the warped frequency spectral estimate and the representation of the fine estimate.

13. Computer-readable storage hardware having computer-executable instructions embodied thereon that, when executed by at least one processor, cause the at least one processor to perform acts comprising:
- decoding a representation of a warped frequency spectral estimate of an original audio signal;
- decoding a representation of a fine estimate of the original audio signal;
- passing the representation of the warped frequency spectral estimate to a speech recognition engine; and
- reconstructing an audio signal that represents the original audio signal using the representation of the warped frequency spectral estimate and the representation of the fine estimate.

14. The computer-readable storage hardware of claim 13, wherein the reconstruction comprises expanding a dynamic range of the representation of the warped frequency spectral estimate.

15. The one or more computer-readable storage hardware of claim 13, wherein:
- decoding the representation of the warped frequency spectral estimate comprises extracting the representation of the warped frequency spectral estimate from a data stream, and
  - decoding the representation of the fine estimate comprises extracting the representation of the fine estimate from the data stream and using the representation of the warped frequency spectral estimate.

16. The one or more computer-readable storage hardware of claim 13, wherein reconstructing the audio signal that represents the original audio signal comprises performing an inverse of a transform operation on the representation of the warped frequency spectral estimate.

17. The one or more computer-readable storage hardware of claim 13, wherein:
- the warped frequency spectral estimate is a first warped frequency spectral estimate;
- the original audio signal is a first original audio signal;
- decoding the representation of the first warped frequency spectral estimate, decoding the representation of the fine estimate, passing the representation of the first warped frequency spectral estimate to the speech recognition engine, and reconstructing the audio signal that represents the first original audio signal are all performed in a first operating mode; and
- the acts further comprise transitioning from the first operating mode to a second operating mode and performing acts in the second operating mode, the acts in the second operating mode comprising:
  - decoding a representation of a second warped frequency spectral estimate of a second original audio signal; and
  - passing the representation of the second warped frequency spectral estimate to the speech recognition engine;
  - wherein the second operating mode does not include reconstructing an audio signal that represents the second original audio signal.

18. A computer-implemented method comprising:
a speech encoding system performing acts comprising:
- encoding a representation of a warped frequency spectral estimate of an original audio signal based on a warped frequency spectrum, the encoding comprising a dynamic range reduction operation and a cosine transform operation;
- generating a representation of a smooth spectral estimate of a spectrum of the original audio signal using the warped frequency spectral estimate representation;
- encoding a representation of a fine frequency spectral estimate of fine details of the original audio signal using the smooth estimate representation;
- packaging the representation of the fine estimate and the representation of the warped frequency spectral estimate in a data stream; and
- sending the data stream to a speech decoding and recognition system.

19. The computer-implemented method of claim 18, wherein the speech encoding system comprises a mobile handheld device.

20. The computer-implemented method of claim 18, further comprising:
- receiving the data stream at the speech decoding and recognition system;
- in the speech decoding and recognition system, performing acts comprising:
  - decoding components of the data stream, including decoding the representation of the warped frequency spectral estimate of the original audio signal, and decoding the representation of the fine estimate of the original audio signal;
  - passing the representation of the warped frequency spectral estimate to a speech recognition engine in the speech recognition system; and
  - reconstructing an audio signal that represents the original audio signal, the reconstruction comprising expanding a dynamic range of the representation of the warped frequency spectral estimate, performing an inverse of the cosine transform operation, using the warped frequency spectral estimate representation to generate a smooth spectral estimate representation, and combining the smooth spectral estimate with the fine estimate.

* * * * *